United States Patent
Mochida et al.

(10) Patent No.: US 10,263,482 B2
(45) Date of Patent: Apr. 16, 2019

(54) PERMANENT MAGNET EMBEDDED-TYPE ROTATING ELECTRIC MACHINE AND MANUFACTURING METHOD THEREOF

(71) Applicant: FUJI ELECTRIC CO., LTD., Kawasaki-shi (JP)

(72) Inventors: Toshiharu Mochida, Fujimi (JP); Takashi Sakiyama, Kuwana (JP); Masao Shuto, Suzuka (JP); Toshiya Sasaki, Suzuka (JP); Hirofumi Nishimura, Suzuka (JP); Takeshi Iwamoto, Suzuka (JP); Yuji Nakazaki, Suzuka (JP); Takasumi Chikazawa, Tsu (JP); Keizou Kato, Nagoya (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 501 days.

(21) Appl. No.: 14/941,518

(22) Filed: Nov. 13, 2015

(65) Prior Publication Data

US 2016/0072348 A1   Mar. 10, 2016

Related U.S. Application Data

(63) Continuation of application No. PCT/JP2014/074141, filed on Sep. 11, 2014.

(30) Foreign Application Priority Data

Oct. 2, 2013   (JP) .................................. 2013-207149

(51) Int. Cl.
*H02K 1/27*    (2006.01)
*H02K 1/30*    (2006.01)
(Continued)

(52) U.S. Cl.
CPC ............... *H02K 1/276* (2013.01); *H02K 1/02* (2013.01); *H02K 1/30* (2013.01); *H02K 15/03* (2013.01)

(58) Field of Classification Search
CPC .......... H02K 15/12; H02K 7/20; H02K 1/276; H02K 1/02; H02K 1/30; H02K 15/03
(Continued)

(56) References Cited

U.S. PATENT DOCUMENTS 8,766,503 B2    7/2014 Kagami et al.
2007/0046139 A1   3/2007 Ishizuka
(Continued)

FOREIGN PATENT DOCUMENTS

CN    101371418 A    2/2009
CN    102710040 A    10/2012
(Continued)

OTHER PUBLICATIONS

Machine Translation JP0919093 (1997).*

*Primary Examiner* — Alex W Mok
(74) *Attorney, Agent, or Firm* — Rabin & Berdo, P.C.

(57) ABSTRACT

Cracking and flying around of permanent magnets in a permanent magnet embedded-type rotating electric machine is prevented. Thermally hardening FRP is used as a reinforcement sheet, and the reinforcement sheet is wrapped around the periphery of a permanent magnet and caused to adhere to the surface of the permanent magnet by being thermally hardened. Subsequently, the permanent magnet to which the reinforcement sheet is adhering is embedded in magnet embedding holes of the rotor. The surface of the reinforcement sheet after thermal hardening is in a state of not being attached to the inner wall surface of the magnet embedding holes. Consequently, no stress caused by the difference between the linear expansion coefficients of the
(Continued)

rotor and permanent magnets acts on the permanent magnets when the temperature of the rotor rises, and cracking of the permanent magnets can thus be prevented.

13 Claims, 6 Drawing Sheets

(51) Int. Cl.
*H02K 1/02* (2006.01)
*H02K 15/03* (2006.01)

(58) Field of Classification Search
USPC .......................... 310/156.21, 156.28, 156.31
See application file for complete search history.

(56) References Cited

U.S. PATENT DOCUMENTS

| | | | |
|---|---|---|---|
| 2007/0228866 A1* | 10/2007 | Nakamura | H02K 21/044 310/263 |
| 2008/0129129 A1* | 6/2008 | Kori | H02K 1/276 310/58 |
| 2009/0001839 A1 | 1/2009 | Masayuki et al. | |
| 2013/0043757 A1* | 2/2013 | Kagami | H02K 1/2766 310/156.53 |
| 2013/0074757 A1 | 2/2013 | Kagami et al. | |
| 2013/0099617 A1* | 4/2013 | Chamberlin | H02K 1/2766 310/156.21 |
| 2013/0221784 A1* | 8/2013 | Kori | H02K 1/27 310/90 |

FOREIGN PATENT DOCUMENTS

| | | |
|---|---|---|
| EP | 1780870 A1 | 5/2007 |
| EP | 2562913 A2 | 2/2013 |
| JP | 09019093 A * | 1/1997 |
| JP | H09-19093 A | 1/1997 |
| JP | H09-163649 A | 6/1997 |
| JP | 2001-086671 A | 3/2001 |
| JP | 2002-209439 A | 7/2002 |
| JP | 2002-359942 A | 12/2002 |
| JP | 2004-007937 A | 1/2004 |
| JP | 2007-089383 A | 4/2007 |
| JP | 2013-046421 A | 3/2013 |

* cited by examiner

PERMANENT MAGNET EMBEDDED-TYPE ROTATING ELECTRIC MACHINE AND MANUFACTURING METHOD THEREOF

This application is a continuation under 35 U.S.C. 120 of International Application PCT/JP2014/074141 having the International Filing Date of Sep. 11, 2014, and having the benefit of the earlier filing date of Japanese Application No. 2013-207149, filed Oct. 2, 2013. Each of the identified applications is fully incorporated herein by reference.

BACKGROUND

Technical Field

The present invention relates to a rotating electric machine having a rotor, such as a motor or generator, and in particular, relates to a permanent magnet embedded-type rotating electric machine wherein permanent magnets are embedded in the rotor.

Background Art

In this kind of permanent magnet embedded-type rotating electric machine, the permanent magnets are inserted into magnet embedding holes formed in the rotor. The permanent magnets are a member that cracks comparatively easily. However, when the permanent magnets crack and divide, the performance of the permanent magnet embedded-type rotating electric machine depreciates. Also, depending on the way in which the permanent magnets crack, the magnets move inside the magnet embedding holes. Further, when movement of the magnets starts, the magnets collide with the inner wall of the magnet embedding holes, and occasions for the magnets to crack increase further. Also, when the magnets move inside the magnet embedding holes, there is a danger of the rotor balance breaking down, and rotor vibration increasing due to the effect of centrifugal force acting on the rotor.

CITATION LIST

Patent Literature

PTL 1: JP-A-9-163649

PTL 1 exists as technical literature disclosing technology whereby cracking of permanent magnets in a permanent magnet embedded-type rotating electric machine is prevented. The technology disclosed in PTL 1 is such that permanent magnets on an outer peripheral portion of which is disposed adhesive sheets impregnated or coated with an adhesive is inserted into a rotor magnet embedding holes. By so doing, cracking of the permanent magnets when inserting can be prevented. However, the technology disclosed in PTL 1 is such that the permanent magnets are attached and fixed to the inner wall of the rotor magnet embedding holes by the adhesive sheets. Herein, the linear expansion coefficients of the permanent magnets and rotor steel differ. Consequently, when a state wherein the permanent magnets are attached and fixed to the inner wall of the rotor magnet embedding holes exists, there is a problem in that excessive stress caused by the difference between the linear expansion rates of the rotor and permanent magnets are exerted on the permanent magnets when, for example, the temperature of the rotor rises due to operation of the rotating electric machine, and cracking occurs in the permanent magnets.

SUMMARY

The invention, having been contrived with the heretofore described kind of situation in mind, has an object of providing technological means whereby cracking of permanent magnets in a permanent magnet embedded-type rotating electric machine is prevented, not only when the permanent magnets are embedded in a rotor, but also after the embedding.

The invention provides a permanent magnet embedded-type rotating electric machine, formed by permanent magnets to which reinforcement sheets are adhering being embedded in magnet embedding holes formed in the circumferential direction in a rotor, wherein the surface of the reinforcement sheets are in a state of not being attached to the inner wall surface of the magnet embedding holes.

According to the invention, reinforcement sheets are adhering to permanent magnets embedded in magnet embedding holes of a rotor. Consequently, cracking of the permanent magnets can be prevented. Also, according to the invention, the surface of the reinforcement sheets embedded in the magnet embedding holes of the rotor is in a state of not being attached to the inner wall surface of the magnet embedding holes. Therefore, it is possible to avoid a situation wherein stress caused by the difference between the linear expansion coefficients of the rotor and permanent magnets acts on the permanent magnets when, for example, the temperature of the rotor rises due to an operation of the permanent magnet embedded-type rotating electric machine, and thus possible to prevent cracking of the permanent magnets.

DETAILED DESCRIPTION

Figure 1:
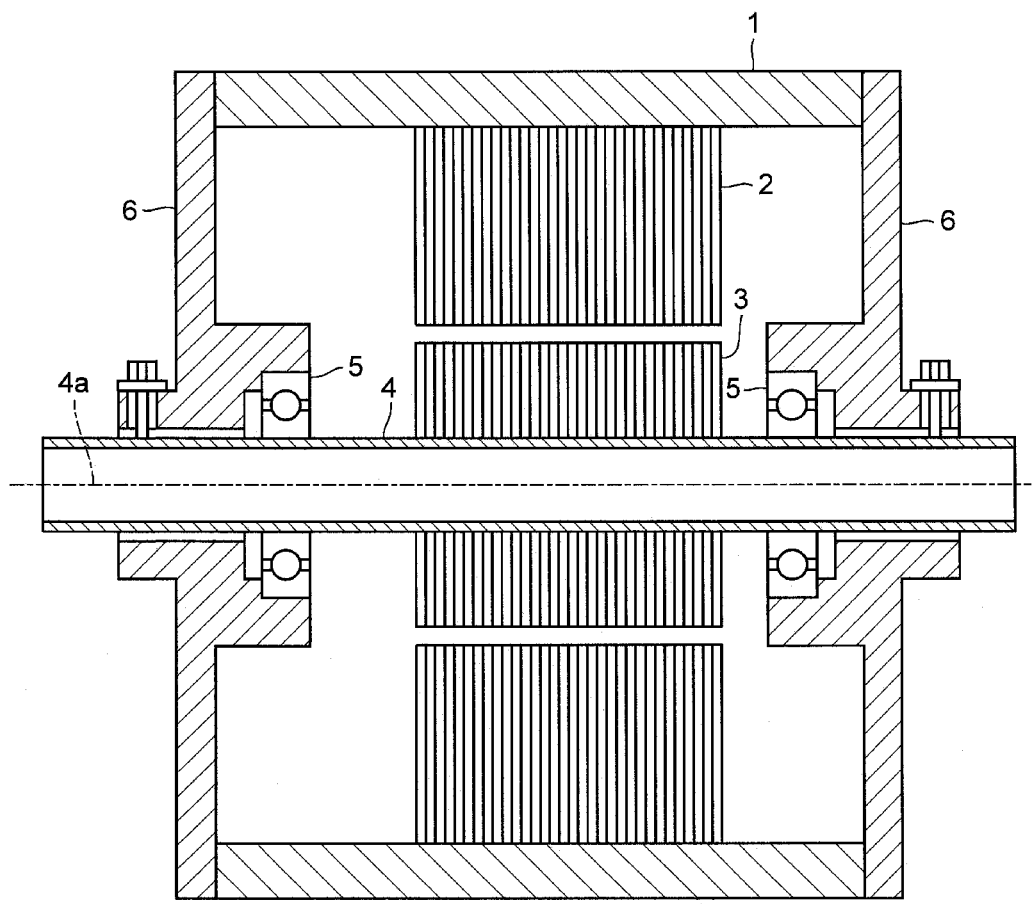
FIG. 1 is a vertical sectional view showing a configuration of a permanent magnet embedded-type rotating electric machine, which is an application of the invention.

Hereafter, referring to the drawings, a description will be given of embodiments of the invention.

(Application of Invention)

FIG. 1 is a vertical sectional view showing a configuration example of a permanent magnet embedded-type rotating electric machine, which is an application of the invention. In FIG. 1, frame 1 is a housing body that covers the whole of the permanent magnet embedded-type rotating electric machine, and is configured of iron, aluminum, stainless steel, or the like. A hollow, cylindrical fixed side iron core 2 is provided on the inner side of the frame 1. The fixed side iron core 2 is formed by stacking silicon steel plates. A multiple of teeth are formed on the fixed side iron core 2, and a stator coil formed of copper wire or the like is wound around each tooth (omitted from the drawing). A rotor 3, which is a rotating side iron core, is inserted on the inner side of the fixed side iron core 2, in a state maintaining a predetermined gap from the fixed side iron core 2. The rotor 3 is formed by stacking silicon steel plates. There are also cases in which the rotor 3 is configured by carrying out a cutting process on a simple iron block. A shaft 4 formed of iron or the like penetrates the center of the rotor 3. Ideally, the central axis of the shaft 4 forms a rotation center axis 4a of the rotor 3. Further, the shaft 4 is supported by a shield 6 provided at either front-back end of the frame 1, via a rolling bearing 5 formed of bearing steel or the like.

Herein, a description will be given with a motor as an example of a permanent magnet embedded-type rotating electric machine, but the same applies in the case of a generator. In the motor, the rotor 3 is provided with energy by a rotating magnetic field created by stator coils (not shown), and rotates around the rotation center axis 4a.

Figure 2:
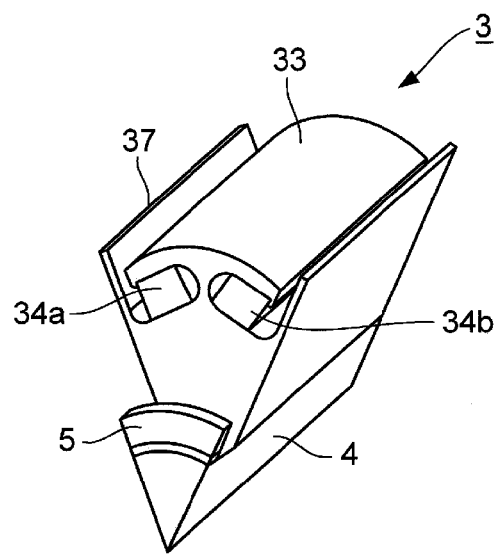
FIG. 2 is a perspective view showing the configuration of one pole of a rotor of the same permanent magnet embedded-type rotating electric machine.
Figure 3:
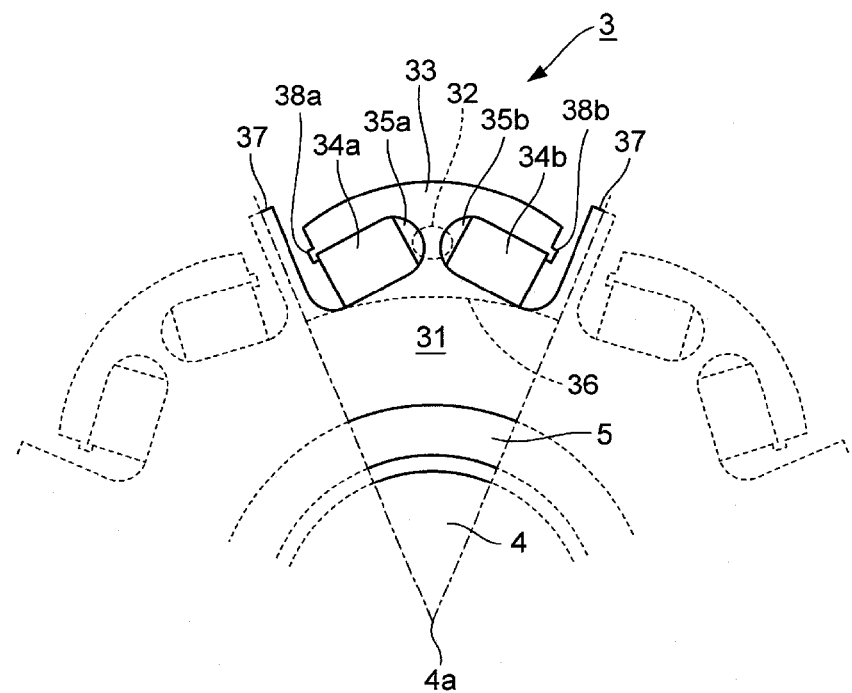
FIG. 3 is a front elevational view showing the configuration of one pole of a rotor of the same permanent magnet embedded-type rotating electric machine.

FIG. 2 is a perspective view showing the configuration of one pole of the rotor 3. Also, FIG. 3 is a front elevational view of the one pole of the rotor 3 seen from the direction of the rotation center axis 4a. In FIG. 3, in addition to the configuration of the one pole, the configurations of the two neighboring poles in the direction of rotation of the one pole are shown by broken lines in order to facilitate understanding of the configuration of the rotor 3.

The rotor 3 can be broadly divided into a core portion 31 toward the rotation center axis 4a, two permanent magnets 34a and 34b provided in each pole, an outer peripheral edge portion 33 of each pole formed of the rotor steel on the outer side of the permanent magnets 34a and 34b as seen from the rotation center axis 4a, a center bridge 32 of each pole, formed between magnet embedding holes 35a and 35b, that links the core portion 31 and outer peripheral edge portion 33, and a q-axis projection 37 provided between poles.

The outer peripheral edge portion 33 of the one pole has an approximately arc-shaped sectional form, and is linked via the center bridge 32 to the core portion 31 in the center in the rotor rotation direction. The outer peripheral surface of the outer peripheral edge portion 33 has a radius of curvature smaller than the distance from the rotation center axis 4a to the outermost peripheral portion of the rotor. In this way, the radius of curvature of one portion of the outer peripheral edge portion 33, rather than that of the whole of the outer peripheral edge portion 33, may be smaller than the distance from the rotation center axis 4a to the outermost peripheral portion of the rotor. Also, it not being necessary that the outer peripheral surface of the outer peripheral edge portion 33 is curved, it is sufficient that the outer peripheral surface of the outer peripheral edge portion 33 positioned on an extension line passing through the center bridge 32 as seen from the center of rotation of the rotor is farther from the center of rotation of the rotor than the outer peripheral surface in other positions. In this way, the torque of the permanent magnet embedded-type rotating electric machine can be increased by increasing the magnetic resistance of the center bridge 32 and reducing the magnetic resistance of a stator disposed on the outer periphery of the rotor and the outer peripheral edge portion 33. By adopting this kind of form for the outer peripheral edge portion 33, the harmonic component of the torque is reduced, and the fundamental component of the torque generated in the rotor 3 can be increased by the amount of the reduction.

The magnet embedding hole 35a, for holding the permanent magnet 34a, and the magnet embedding hole 35b, for holding the permanent magnet 34b, are provided on the inner side of the outer peripheral edge portion 33. The magnet embedding holes 35a and 35b are enclosed from three directions by the outer peripheral edge portion 33, center bridge 32, and core portion 31. The outer peripheral edge portion 33 supports the permanent magnets 34a and 34b on the rotation center axis 4a side against the centrifugal force acting on the permanent magnets 34a and 34b when the rotor 3 rotates. The outer peripheral edge portions 33 corresponding to each pole are aligned in the rotor rotation direction, maintaining a gap from the neighboring outer peripheral edge portions 33. The gap between two outer peripheral edge portions 33 is positioned on the side opposite to that of the center bridge 32, that is, halfway between the poles. The magnet embedding holes 35a and 35b communicate with the outer periphery of the rotor via the gap between the two outer peripheral edge portions 33. As there is no gap between two outer peripheral edge portions 33 in existing, publicly-known general rotors, there are many that have a side bridge connecting two outer peripheral edge portions 33. One characteristic of the rotor 3 shown in FIG. 2 and FIG. 3 is that this side bridge is omitted.

The magnet embedding holes 35a and 35b are arrayed in a reverse V-shape. Further, a region (the core portion 31) on the rotation center axis 4a side of the inner peripheral walls of the magnet embedding holes 35a and 35b is inclined in a direction such as to become farther from the rotation center axis 4a as it moves away from halfway between neighboring poles and nears a region between the two magnet embedding holes (that is, the center bridge 32). Therefore, the center bridge 32 is in a position distanced outwardly in the rotor radial direction from an inscribed circle 36 of all the magnet embedding holes 35a and 35b of the rotor 3.

The q-axis projection 37 passes through the gap between two outer peripheral edge portions 33 in a position on the core portion 31 halfway between poles, projecting in a centrifugal direction (a direction away from the rotation center axis 4a). Positioning projections 38a and 38b that regulate movement of the permanent magnets 34a and 34b to the q-axis projection 37 side are provided in the magnet embedding holes 35a and 35b. The positioning projections 38a and 38b protrude toward the rotation center axis 4a in a region of the inner walls of the magnet embedding holes 35a and 35b on the outer side in the rotor radial direction as seen from the permanent magnets 34a and 34b, that is, in an end portion on the q-axis projection 37 side on the inner side of the outer peripheral edge portion 33. The permanent magnets 34a and 34b are pressed against the positioning projections 38a and 38b, and thereby fixed inside the magnet embedding holes 35a and 35b. A pair of end plates (not shown) are provided one at either end in the axial direction of the rotor 3 so that the permanent magnets 34a and 34b do not fall out in the axial direction.

The above is the configuration of the rotor 3.

The reason for the magnet embedding holes 35a and 35b being caused to communicate with the outer periphery of the rotor in the rotor 3 is as follows. In manufacturing the motor, a method whereby the shaft and rotor steel are assembled by an interference fitting such as shrink fitting is common. Tensile stress remains in the peripheral direction in the rotor steel in the interference fitting step. This remaining stress barely occurs on a circumference having the same radius as a portion wherein there is a hole, depression, or the like, in the rotor steel (that is, stress does not remain except in a portion that has no hole or depression and that is continuous in a ring form).

Meanwhile, an enormous centrifugal force is generated in each portion of the rotor when the rotor 3 rotates at high speed. At this time, when the rotor has a center bridge and a side bridge, large stress is generated in the center bridge and side bridge. In this case, due to the centrifugal force generated by the rotation of the rotor, tensile stress acts on the center bridge while shearing stress acts on the side bridge. Therefore, in order to prevent damage to the rotor due to high speed rotation, it is necessary to sufficiently strengthen the side bridge rather than the center bridge, which point makes the rotor strength design difficult. Therefore, in this example, a configuration wherein the magnet embedding holes 35a and 35b communicate with the outer periphery of the rotor, that is, a configuration wherein there is no side bridge, is employed as the rotor configuration. According to this configuration, as the rotor has no side bridge on the outermost periphery thereof, no residual assembly stress remains on the outermost periphery of the rotor. Stress generated by the centrifugal force when the rotor rotates concentrates on the center bridge, but as the stress acting on the center bridge is tensile stress, damage to the center bridge can easily be prevented by adjusting the width of the center bridge, or the like.

However, as the heretofore described permanent magnet embedded-type rotating electric machine has no side bridge, and the magnet embedding holes 35a and 35b communicate with the outer periphery of the rotor, permanent magnet fragments are expelled from the magnet embedding holes 35a and 35b to the outer periphery of the rotor when cracking occurs in the permanent magnet 34a or 34b, and in the worst case, a problem may occur in that the fragments become stuck, and the rotor is unable to rotate. Therefore, in each embodiment of the invention, permanent magnets 34a and 34b having reinforcement sheets attached to the outer peripheral surfaces thereof are inserted in the magnet embedding holes 35a and 35b. Herein, in a state wherein the permanent magnets 34a and 34b are inserted in the magnet embedding holes 35a and 35b, the reinforcement sheets of the permanent magnets 34a and 34b are in a state of not being attached to the inner walls of the magnet embedding holes 35a and 35b, and can slide against the inner walls. This is the major characteristic of the invention.

First Embodiment

Figure 4:
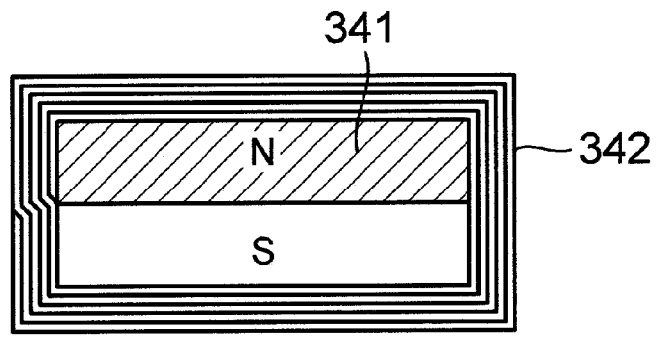
FIG. 4 is a front elevational view showing the configuration of permanent magnets and reinforcement sheets embedded in magnet embedding holes of the rotor in a first embodiment of the invention.

FIG. 4 is a front elevational view showing the configuration of a permanent magnet 341 and reinforcement sheet 342 inserted into the magnet embedding holes 35a and 35b (refer to FIG. 2 and FIG. 3) of the rotor 3 in a first embodiment of the invention. In the example, five turns of FRP (fiber-reinforced plastic) are wound as the reinforcement sheet 342 around four surfaces, including the magnetized surfaces (the surfaces on which is the N pole or S pole of the permanent magnet), of the permanent magnet 341. Herein, the thickness of one turn of the reinforcement sheet 342 is in the region of 80 μm. The reinforcement sheet 342 and permanent magnet 341 are heated in a state wherein the reinforcement sheet 342 is wound around, thereby thermally hardening the reinforcement sheet 342 and causing the reinforcement sheet 342 to adhere to the surface of the permanent magnet 341. An FRP wherein epoxy is used as the plastic and glass fiber used as the fiber is applied as the FRP. By using epoxy having hardening conditions such that the hardening temperature of the plastic does not exceed the Curie temperature of the permanent magnet, the magnetic characteristics of the permanent magnet can be prevented from changing when carrying out thermal hardening. When the temperature drops after thermal hardening, the surface of the reinforcement sheet 342 dries, reaching a state wherein there is no adhesive action. In this state, the permanent magnet 341 to which the reinforcement sheet 342 is adhering is inserted in the magnet embedding holes 35a and 35b of the rotor 3, and magnetization of the permanent magnet 341 is carried out.

According to this embodiment, as the permanent magnet 341 to which the reinforcement sheet 342 is adhering is inserted in the magnet embedding holes 35a and 35b of the rotor 3, the permanent magnet 341 can be made less likely to crack when inserting. Also, in this embodiment, the surface of the reinforcement sheet 342 adhering to the permanent magnet 341 is in a state of not being attached to the inner wall of the magnet embedding hole 35a or 35b, and is slidable. Consequently, it is possible to avoid a situation wherein stress caused by the difference between the linear expansion coefficients of the rotor 3 and permanent magnet 341 acts on the permanent magnet 341, thus preventing cracking of the permanent magnet 341, when the permanent magnet embedded-type rotating electric machine is operating, even when, for example, the temperature of the rotor 3 rises. Also, this configuration is such that, even in the event that the permanent magnet 341 cracks, fragments are unlikely to separate, and there is unlikely to be the kind of situation wherein the permanent magnet 341 moves inside the magnet embedding hole 35a or 35b.

Second Embodiment

Figure 5:
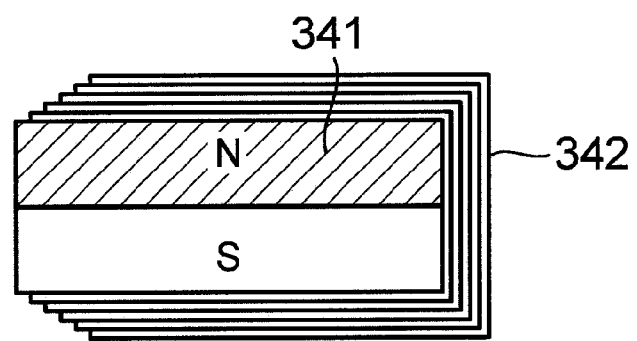
FIG. 5 is a front elevational view showing the configuration of the permanent magnets and reinforcement sheets embedded in the magnet embedding holes of the rotor in a second embodiment of the invention.

FIG. 5 is a front elevational view showing the configuration of the permanent magnet 341 and reinforcement sheet 342 inserted into the magnet embedding holes 35a and 35b of the rotor 3 in a second embodiment of the invention. In the first embodiment, five turns of the reinforcement sheet 342 are wound around four surfaces, including the magnetized surfaces, of the permanent magnet 341, but in this embodiment, five turns of the reinforcement sheet 342 are wound around three surfaces, which are the two magnetized surfaces and one non-magnetized surface. That is, in this embodiment, the reinforcement sheet 342 is not adhering to one non-magnetized surface of the four surfaces on the periphery of the permanent magnet 341.

In this embodiment, when embedding the permanent magnet 341 in the rotor 3, the permanent magnet 341 is inserted in the magnet embedding hole 35a or 35b so that the non-magnetized surface of the permanent magnet 341 to which the reinforcement sheet 342 is not adhering is on the center bridge 32 side. By so doing, the non-magnetized surface covered by the reinforcement sheet 342, of the four surfaces on the periphery of the permanent magnet 341, is aligned with the gap causing the magnet embedding hole 35a or 35b to communicate with the outer periphery of the rotor 3. Consequently, cracking of the permanent magnet 341 on this non-magnetized surface can be prevented, and fragments of the permanent magnet 341 can be prevented from flying toward the outer periphery of the rotor 3. Also, according to this configuration, even in the event that cracking of the permanent magnet 341 occurs on the non-magnetized surface to which the reinforcement sheet 342 is not adhering, the main body of the permanent magnet 341 impedes fragments of the permanent magnet 341 attempting to leave the magnet embedding hole 35a or 35b toward the outer periphery of the rotor 3. Consequently, flying of fragments of the permanent magnet 341 to the outer periphery of the rotor 3 can be prevented. Consequently, the same advantages as in the first embodiment can be obtained in this embodiment too. Also, in this embodiment, the reinforcement sheet 342 is wound around only three surfaces of the permanent magnet 341, because of which the process of winding the reinforcement sheet 342 around the permanent magnet 341 can be carried out more easily than in the first embodiment, wherein the reinforcement sheet 342 is wound around four surfaces.

Third Embodiment

Figure 6:
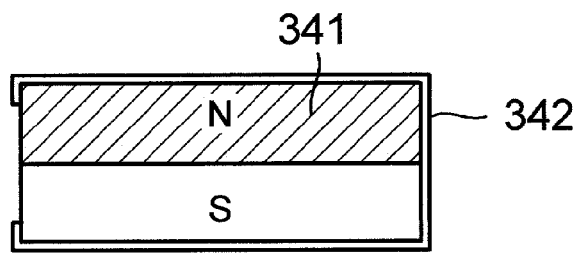
FIG. 6 is a front elevational view showing the configuration of the permanent magnets and reinforcement sheets embedded in the magnet embedding holes of the rotor in a third embodiment of the invention.

FIG. 6 is a front elevational view showing the configuration of the permanent magnet 341 and reinforcement sheet 342 inserted into the magnet embedding holes 35a and 35b of the rotor 3 in a third embodiment of the invention. In the second embodiment (FIG. 5), five turns of the reinforcement sheet 342 are wound around the two magnetized surfaces and one non-magnetized surface of the permanent magnet 341, but in this embodiment, one turn of the reinforcement sheet 342 is wound around the two magnetized surfaces and one non-magnetized surface of the permanent magnet 341. Also, in this embodiment, an end portion of the reinforcement sheet 342 juts out slightly from the two magnetized surfaces of the permanent magnet 341, bends, and adheres to the non-magnetized surface.

Herein, the FRP used as the reinforcement sheet 342 is such that the adhesive strength between turns of the FRP when multiple turns are wound is high, but the adhesive strength between the FRP and permanent magnet 341 is low. Therefore, in this embodiment, the adhesive strength between the FRP and permanent magnet 341 is increased by attaching the FRP to the surface of the permanent magnet 341 by, for example, pressing the FRP against the surface of the permanent magnet 341 using a large winding force, and thermally hardening the FRP.

In this embodiment too, when embedding the permanent magnet 341 in the rotor 3, the permanent magnet 341 is inserted in the magnet embedding hole 35a or 35b so that the non-magnetized surface of the permanent magnet 341 to which the reinforcement sheet 342 is not adhering is on the center bridge 32 side.

In this embodiment too, the same advantages as in the first and second embodiments can be obtained. Also, in this embodiment, the reinforcement sheet 342 sandwiched between the magnetized surfaces of the permanent magnet 341 and the inner wall surface of the magnet embedding hole 35a or 35b has only one turn of thickness. Consequently, the magnetic flux density between the magnetized surfaces of the permanent magnet 341 and the inner wall surface of the magnet embedding hole 35a or 35b can be increased, and a large torque can be generated in the rotor 3 by a small scale permanent magnet 341. Also, in this embodiment, an end portion of the reinforcement sheet 342 juts out slightly from the two magnetized surfaces of the permanent magnet 341, bends, and adheres to the non-magnetized surface. In this way, in this embodiment, the reinforcement sheet 342 covers corner portions on the boundaries between the magnetized surfaces and non-magnetized surface of the permanent magnet 341. Consequently, the corner portions on the boundaries between the magnetized surfaces and non-magnetized surface of the permanent magnet 341 can be prevented from colliding directly with the inner wall of the magnet embedding hole 35a or 35b, and cracking of the permanent magnet 341 can thus be prevented.

Fourth Embodiment

Figure 7:
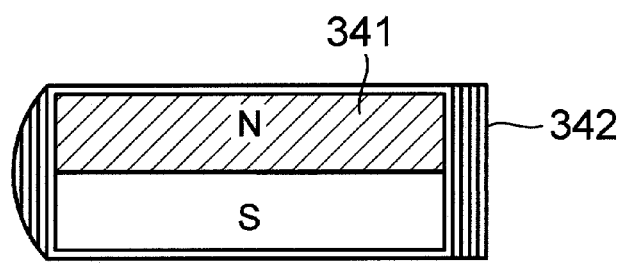
FIG. 7 is a front elevational view showing the configuration of the permanent magnets and reinforcement sheets embedded in the magnet embedding holes of the rotor in a fourth embodiment of the invention.

FIG. 7 is a front elevational view showing the configuration of the permanent magnet 341 and reinforcement sheet 342 inserted into the magnet embedding holes 35a and 35b of the rotor 3 in a fourth embodiment of the invention. In this embodiment, after five turns of the reinforcement sheet 342 are wound around four surfaces, including the two magnetized surfaces, of the permanent magnet 341 and thermally hardened, a chamfering process is added to the left surface in accordance with the form of the inner wall of the magnet embedding hole 35a or 35b.

In this embodiment, when embedding the permanent magnet 341 in the rotor 3, the permanent magnet 341 is inserted in the magnet embedding hole 35a or 35b so that the chamfered non-magnetized surface of the permanent magnet 341 to which the reinforcement sheet 342 is not adhering is on the center bridge 32 side. By so doing, when the permanent magnet 341 and reinforcement sheet 342 are inserted into the kind of rounded magnet embedding hole 35a or 35b shown as an example in FIG. 3, the chamfered, rounded reinforcement sheet 342 comes into contact with the inner wall of the magnet embedding hole 35a or 35b. Herein, when the radial curvature of the left-side end portion of the reinforcement sheet 342 in FIG. 7 is small, the portion wherein the reinforcement sheet 342 comes into contact with the inner wall of the magnet embedding hole 35a or 35b is easily damaged. However, as the left-side end portion of the reinforcement sheet 342 in FIG. 7 has a sufficiently large radial curvature, the shock of contact with the inner wall of the magnet embedding hole 35a or 35b is lessened, and damage can be avoided.

Also, in this embodiment, a process of removing four turns is added to the top and bottom two surfaces of the reinforcement sheet 342 in FIG. 7, whereby the thickness of the reinforcement sheet 342 between the magnetized surfaces of the permanent magnet 341 and the inner wall of the magnet embedding hole 35a or 35b is that of one turn. Consequently, in the same way as in the third embodiment, the magnetic flux density between the magnetized surfaces of the permanent magnet 341 and the inner wall surface of the magnet embedding hole 35a or 35b can be increased, and a large torque can be generated in the rotor 3 by a small scale permanent magnet 341.

Fifth Embodiment

Figure 8:
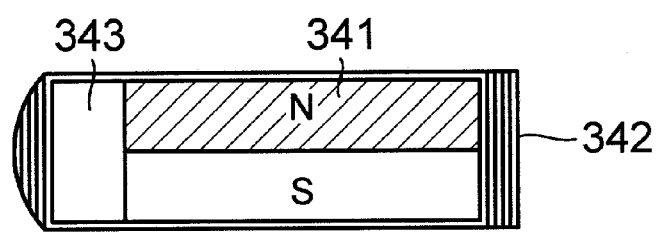
FIG. 8 is a front elevational view showing the configuration of the permanent magnets, reinforcement sheets and spacers embedded in the magnet embedding holes of the rotor in a fifth embodiment of the invention.

FIG. 8 is a front elevational view showing the configuration of the permanent magnet 341, the reinforcement sheet 342, and a spacer 343 inserted into the magnet embedding holes 35a and 35b of the rotor 3 in a fifth embodiment of the invention. In this embodiment, the reinforcement sheet 342 of the same aspect as in the fourth embodiment is caused to adhere to the permanent magnet 341, but the non-magnetic and non-conductive spacer 343 formed of nylon or the like is provided on the inner side of the first turn of the reinforcement sheet 342. Specifically, in this embodiment, the nylon spacer 343 is attached and fixed in advance to the left end of the permanent magnet 341, after which the reinforcement sheet 342 formed of FRP is wrapped around and thermally hardened, and the same FRP chamfering and removal processes as in the fourth embodiment are carried out. Instead of being attached and fixed to the permanent magnet 341 with an adhesive, the spacer 343 may be fixed to the permanent magnet 341 with a fixture such as a screw.

In this embodiment, when embedding the permanent magnet 341 in the rotor 3, the permanent magnet 341 is inserted in the magnet embedding hole 35a or 35b so that the non-magnetized surface of the permanent magnet 341 to which the spacer 343 is fixed is on the center bridge 32 side. According to this embodiment, even when the magnet embedding hole 35a or 35b is considerably larger than the permanent magnet 341, the reinforcement sheet 342 can be pressed against the inner wall of the magnet embedding hole 35a or 35b by the spacer 343. Consequently, the number of turns, and the extent of the removal process, of the reinforcement sheet 342 can both be reduced, which is economical.

Also, in this embodiment too, the thickness of the reinforcement sheet 342 between the magnetized surfaces of the permanent magnet 341 and the inner wall of the magnet embedding hole 35a or 35b is that of one turn, in the same way as in the fourth embodiment. Consequently, the magnetic flux density between the magnetized surfaces of the permanent magnet 341 and the inner wall surface of the magnet embedding hole 35a or 35b can be increased, and a large torque can be generated in the rotor 3 by a small scale permanent magnet 341. FRP stacked in advance may also be used as the material of the spacer 343.

Sixth Embodiment

Figure 9:
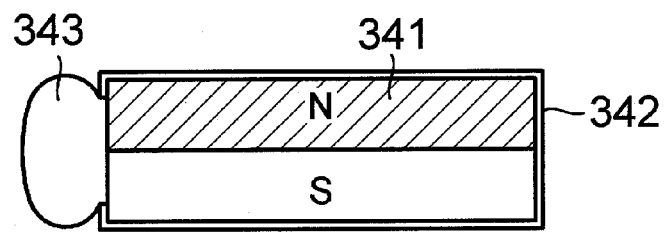
FIG. 9 is a front elevational view showing the configuration of the permanent magnets, reinforcement sheets and spacer embedded in the magnet embedding holes of the rotor in a sixth embodiment of the invention.

FIG. 9 is a front elevational view showing the configuration of the permanent magnet 341, reinforcement sheet 342, and spacer 343 inserted into the magnet embedding holes 35a and 35b of the rotor 3 in a sixth embodiment of the invention.

In this embodiment, the configurations of the permanent magnet 341 and reinforcement sheet 342 are the same as in the third embodiment (FIG. 6). In this embodiment, the spacer 343 formed of nylon or the like is fixed to the non-magnetized surface of the permanent magnet 341 to which the reinforcement sheet 342 is not adhering. The spacer 343 may be fixed to the permanent magnet 341 with an adhesive, or may be fixed to the permanent magnet 341 with fixtures such as screws. Also, FRP stacked in advance may also be used as the material of the spacer 343.

In this embodiment, when embedding the permanent magnet 341 in the rotor 3, the permanent magnet 341 is inserted in the magnet embedding hole 35a or 35b so that the non-magnetized surface of the permanent magnet 341 to which the spacer 343 is fixed is on the center bridge 32 side. In this embodiment too, the same advantages as in the fifth embodiment are obtained.

Seventh Embodiment

Figure 10A:
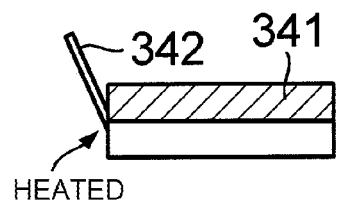
FIGS. 10A, 10B and 10C are diagrams showing steps of manufacturing permanent magnets to which reinforcement sheets are adhering in a seventh embodiment of the invention.
Figure 10B:
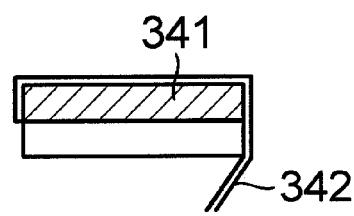
Figure 10C:
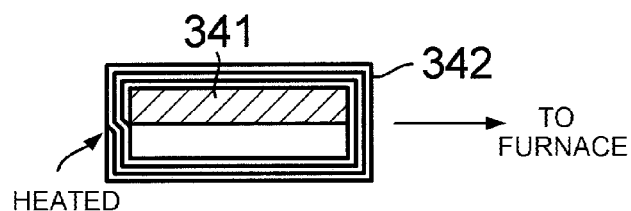

FIGS. 10A, 10B and 10C show one portion of a permanent magnet embedded-type rotating electric machine manufacturing process, which is a seventh embodiment of the invention. Of the steps of the permanent magnet embedded-type rotating electric machine manufacturing process, this embodiment relates in particular to the step of fixing the reinforcement sheet 342 formed of FRP to the permanent magnet 341. This embodiment is preferred for fixing the reinforcement sheet 342 to four surfaces of the permanent magnet 341, as in, for example, the first embodiment (FIG. 4), fourth embodiment (FIG. 7), and fifth embodiment (FIG. 8).

In this embodiment, firstly, in a state wherein an end portion of the reinforcement sheet 342 is fixed to one surface (the left side non-magnetized surface in the example shown in FIG. 10A) on the periphery of the permanent magnet 341, the end portion is thermally hardened by being locally heated, and thereby fixed to the permanent magnet 341, as shown in FIG. 10A. Next, while tension is applied to the reinforcement sheet 342, the reinforcement sheet 342 is wrapped around the periphery of the permanent magnet 341, as shown in FIG. 10B. When the reinforcement sheet 342 is wrapped around the periphery of the permanent magnet 341 for the necessary number of turns, one portion of the reinforcement sheet 342 is thermally hardened by being locally heated, and that portion is attached to an inner turn of the reinforcement sheet 342, as shown in FIG. 10C. The reinforcement sheet 342 left over beyond the place of attachment is cut off. In this way, an object wherein the necessary number of turns of the reinforcement sheet 342 are wrapped around and fixed to the periphery of the permanent magnet 341 is obtained. This object wherein the necessary number of turns of the reinforcement sheet 342 are wrapped around and fixed to the periphery of the permanent magnet 341 is placed into a furnace and heated, whereby the whole of the reinforcement sheet 342 wrapped around the permanent magnet 341 is thermally hardened, and thereby fixed to the periphery of the permanent magnet 341.

According to this embodiment, the adhesive strength of the reinforcement sheet 342 with respect to the permanent magnet 341, and the adhesive strength between the turns of the reinforcement sheet 342, can be increased by the tension applied to the reinforcement sheet 342 being sufficiently high when wrapping the reinforcement sheet 342 around the permanent magnet 341.

Eighth Embodiment

Figure 11:
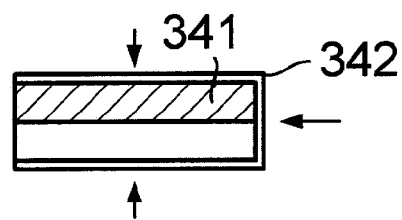
FIG. 11 is a diagram showing a step of manufacturing permanent magnets to which reinforcement sheets are adhering in an eighth embodiment of the invention.

FIG. 11 shows one portion of a permanent magnet embedded-type rotating electric machine manufacturing process, which is an eighth embodiment of the invention. In the same way as the seventh embodiment, this embodiment relates to the step of fixing the reinforcement sheet 342 formed of FRP to the permanent magnet 341. This embodiment is preferred for fixing the reinforcement sheet 342 to the permanent magnet 341 as in, for example, the second embodiment (FIG. 5), third embodiment (FIG. 6), and sixth embodiment (FIG. 9).

In this embodiment, in a state wherein the desired number of turns (one turn in the example shown in FIG. 11) of the reinforcement sheet 342 are brought into contact with the desired surfaces (the upper, lower, and right three surfaces in the example shown in FIG. 11) of the permanent magnet 341, as shown in FIG. 11, the reinforcement sheet 342 is pressed toward the permanent magnet 341, and the reinforcement sheet 342 and permanent magnet 341 are heated in this state, thereby thermally hardening the reinforcement sheet 342.

According to this embodiment, the adhesive strength of the reinforcement sheet 342 with respect to the permanent magnet 341, and the adhesive strength between the turns of the reinforcement sheet 342 (when a multiple of turns of the reinforcement sheet 342 are fixed to the permanent magnet 341), can be increased by the force pressing the reinforcement sheet 342 against the permanent magnet 341 being sufficiently large.

As heretofore described, according to each embodiment of the invention, the reinforcement sheet 342 is caused to adhere to the permanent magnet 341 and embedded in the magnet embedding hole 35a or 35b, because of which the permanent magnet 341 can be made unlikely to crack. Also, even when the permanent magnet 341 cracks, the magnet and fragments can be prevented from separating. Also, according to each embodiment of the invention, the surface of the reinforcement sheet 342 adhering to the permanent magnet 341 and the inner wall of the magnet embedding hole 35a or 35b are in a state of not being attached in a state wherein the permanent magnet 341 is embedded in the magnet embedding hole 35a or 35b. Consequently, it is possible to avoid a situation wherein stress caused by the difference between the linear expansion coefficients of the permanent magnet 341 and rotor 3 acts on the permanent magnet 341 due to a rise in the temperature of the rotor 3 when the permanent magnet embedded-type rotating electric machine is operating, and thus possible to prevent cracking of the permanent magnet 341. Heretofore, it is taken that the surface of the reinforcement sheet 342 and the inner wall of the magnet embedding hole 35a or 35b are in a state of not being attached, but they may also be in a low elasticity attachment state such that there is no cracking of the magnet due to thermal stress caused by the difference between the linear expansion rates of the rotor 3 and permanent magnet 341. Consequently, according to each embodiment of the invention, it is possible to realize a permanent magnet embedded-type rotating electric machine such that a permanent magnet having characteristics such that the magnet intrinsically cracks easily can be used stably over a long period. Furthermore, by thermally hardening the reinforcement sheet 342, thereby causing the reinforcement sheet 342 to adhere to the material of the permanent magnet 341, and subsequently carrying out magnetization of the material of the permanent magnet 341, demagnetization due to high temperature when thermally hardening the reinforcement sheet 342 is eliminated. Also, according to each embodiment of the invention, it is possible to provide a permanent magnet embedded-type rotating electric machine that, for that kind of permanent magnet embedded-type rotating electric machine, is small, low cost, and easily maintained.

Other Embodiments

Heretofore, a description has been given of embodiments of the invention, but other embodiments of the invention are also conceivable. These are, for example, as below.

(1) In the heretofore described embodiments, the reinforcement sheet 342 is wrapped around three surfaces or four surfaces of the permanent magnet 341, but the reinforcement sheet 342 may also be wrapped around one surface, two surfaces, or five or more surfaces, of the permanent magnet 341.

(2) In the heretofore described embodiments, a broadly six sided body is used as the form of the permanent magnet 341, but permanent magnets of another form may also be used.

(3) In the fourth embodiment (FIG. 7) and fifth embodiment (FIG. 8), R chamfering is carried out as the method of chamfering the reinforcement sheet 342, but C chamfering may also be carried out.

Figure 12A:
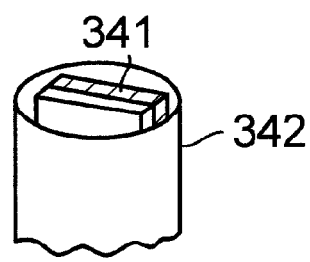
FIGS. 12A and 12B are diagrams showing steps of manufacturing permanent magnets to which reinforcement sheets are adhering in another embodiment of the invention.
Figure 12B:
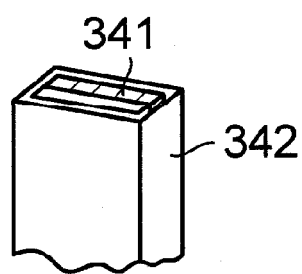

(4) In the heretofore described embodiments, the thermally hardening reinforcement sheet 342 formed of FRP is used, but reinforcement sheets formed of another material may also be used. For example, the permanent magnet 341 may be housed inside a tube-form reinforcement sheet 342 formed of a thermally contracting material, as shown in FIG. 12A, and the reinforcement sheet 342 caused to contract by heating, thereby fixing the reinforcement sheet 342 to the periphery of the permanent magnet 341, as shown in FIG. 12B.

(5) In the heretofore described embodiments, the invention is applied to a rotor having no side bridge, but the invention may also be applied to a rotor having a side bridge.

(6) In the heretofore described embodiments, the reinforcement sheet 342 is caused to adhere to the material of a magnet by being thermally hardened, after which magnetization of the material is carried out to form the permanent magnet 341, but the reinforcement sheet 342 may also be caused to adhere to a magnetized permanent magnet 341.

REFERENCE SIGNS LIST

3 . . . Rotor, 2 . . . Stator, 35a, 35b . . . magnet embedding hole, 34a, 34b, 341 . . . Permanent magnet, 342 . . . reinforcement sheet, 343 . . . Spacer

What is claimed is:

1. A permanent magnet embedded-type rotating electric machine, comprising:
   permanent magnets; and
   reinforcement sheets wound around and adhering to the permanent magnets, the permanent magnets and the reinforcement sheets being embedded in magnet embedding holes formed in a circumferential direction in a rotor, wherein a surface of each of the reinforcement sheets is in a state of not being attached to an inner wall surface of each of the magnet embedding holes, wherein
   the reinforcement sheets each include one or more wrapping turns, and are formed by subjecting a plurality of sheets that each have a plurality of turns, to a removal of respective portions thereof, leaving each of the plurality of sheets with at least one turn.

2. The permanent magnet embedded-type rotating electric machine according to claim 1, wherein each of the magnet embedding holes embeds one of the permanent magnets around which one of the reinforcement sheets is wound.

3. The permanent magnet embedded-type rotating electric machine according to claim 2, wherein a portion of each of the reinforcement sheets adhering to a magnetized surface perpendicular to a magnetization direction of a corresponding one of the permanent magnets is ground away, and a portion of each of the reinforcement sheets adhering to a non-magnetized surface other than the magnetized surface of the corresponding one of the permanent magnets is left.

4. The permanent magnet embedded-type rotating electric machine according to claim 2, further comprising a non-magnetic and non-conductive spacer being added to each of the permanent magnets, and each of the reinforcement sheets being wrapped around a corresponding one of the permanent magnets and a corresponding one of the spacers.

5. The permanent magnet embedded-type rotating electric machine according to claim 4, said each of the spacers is fixed to a corresponding one of the permanent magnets by adhesion or a fixture, and each of the reinforcement sheets wraps around a corresponding one of the permanent magnets and a corresponding one of the spacers.

6. The permanent magnet embedded-type rotating electric machine according to claim 2, further comprising a non-magnetic and non-conductive spacer being added to each of the permanent magnets to which a corresponding one of the reinforcement sheets adheres.

7. A method of manufacturing the permanent magnet embedded-type rotating electric machine of claim 1, wherein
thermally hardening fiber-reinforced plastic sheets are used as the reinforcement sheets, permanent magnets around which the fiber-reinforced plastic sheets are wrapped, respectively, are manufactured by one portion of each of the thermally hardening fiber-reinforced plastic sheets being brought into contact with a surface of a corresponding one of the permanent magnets and the one portion being fixed to the surface of the corresponding one of the permanent magnets by being thermally hardened by heating, each of the fiber-reinforced plastic sheets being wrapped around a periphery of a corresponding one of the permanent magnets, another portion of said each of the fiber-reinforced plastic sheets being brought into contact, and the other portion being fixed to the surface of the corresponding one of the permanent magnets by being thermally hardened by heating, and the permanent magnets to which the reinforcement sheets are adhering, respectively, are manufactured by thermally hardening the fiber-reinforced plastic sheets by heating the permanent magnets around which the fiber-reinforced plastic sheets are wrapped, respectively, thereby causing the fiber-reinforced plastic sheets to adhere to the surface of the permanent magnets.

8. A method of manufacturing the permanent magnet embedded-type rotating electric machine of claim 1, wherein
thermally hardening fiber-reinforced plastic sheets are used as the reinforcement sheets, and the permanent magnets to which the reinforcement sheets are adhering, respectively, are manufactured by each of the thermally hardening fiber-reinforced plastic sheets being thermally hardened and caused to adhere to a surface of each of the permanent magnets by heating while a corresponding one of the fiber-reinforced plastic sheets is pressed against a magnetized surface perpendicular to a magnetization direction of a corresponding one of the permanent magnets and one portion of a non-magnetized surface.

9. A rotor for a permanent magnet embedded-type rotating electric machine, comprising:
a plurality of poles,
each pole having a center bridge and an outer peripheral edge portion separated by a space from an outer peripheral edge portion of an adjacent pole,
the center bridge and the outer peripheral edge portion defining magnetic embedding openings symmetrically arranged with respect to the center bridge;
a permanent magnet in each of the magnetic embedding openings; and
at least one reinforcement sheet attached to the permanent magnet, wherein
the permanent magnet has two magnetic surfaces opposite each other, and two non-magnetic surfaces opposite each other, and the at least one reinforcement sheet extends along a first one of the two magnetic surfaces, along a first one of the two non-magnetic surfaces, and along a second one of the two magnetic surfaces opposite the first one of the two magnetic surfaces, but does not extend along a second one of the two non-magnetic surfaces opposite the first one of the two non-magnetic surfaces.

10. The rotor of claim 9, wherein the at least one reinforcement sheet is unattached to an inner wall surface of each of the magnetic embedding openings.

11. The rotor of claim 9, wherein the at least one reinforcement sheet comprises a plurality of reinforcement sheets wound around the permanent magnet.

12. The rotor of claim 9, wherein the at least one reinforcement sheet comprises fiber-reinforced plastic.

13. A rotor for a permanent magnet embedded-type rotating electric machine, comprising:
a plurality of poles,
each pole having a center bridge and an outer peripheral edge portion separated by a space from an outer peripheral edge portion of an adjacent pole,
the center bridge and the outer peripheral edge portion defining magnetic embedding openings symmetrically arranged with respect to the center bridge;
a permanent magnet in each of the magnetic embedding openings; and
at least one reinforcement sheet attached to the permanent magnet, wherein
the permanent magnet has two magnetic surfaces opposite each other, and two non-magnetic surfaces opposite each other, and the at least one reinforcement sheet extends along a first one of the two magnetic surfaces, along a first one of the two non-magnetic surfaces, along a second one of the two magnetic surfaces opposite the first one of the two magnetic surfaces, and partly along at least a portion of a second one of the two non-magnetic surfaces opposite the first one of the two non-magnetic surfaces, leaving at least a portion of the second one of the two non-magnetic surfaces uncovered by the at least one reinforcement sheet.

* * * * *